United States Patent [19]

Robinson et al.

[11] Patent Number: 4,810,310
[45] Date of Patent: Mar. 7, 1989

[54] COMPOSITES HAVING IMPROVED RESISTANCE TO STRESS RELAXATION

[75] Inventors: Peter W. Robinson, Branford; Eugene Shapiro, Hamden; William L. Brenneman, Cheshire, all of Conn.

[73] Assignee: Olin Corporation, New Haven, Conn.

[21] Appl. No.: 140,183

[22] Filed: Dec. 31, 1987

Related U.S. Application Data

[62] Division of Ser. No. 866,665, May 27, 1986, Pat. No. 4,735,868.

[51] Int. Cl.[4] .............................................. C22F 1/08
[52] U.S. Cl. ........................ 148/11.5 C; 146/11.5 Q; 146/127
[58] Field of Search ............... 428/675, 677, 678, 931, 428/929; 339/278 C; 200/266, 268, 269; 148/11.5 Q, 127, 11.5 C, 11.5 N, 13.2, 411, 414

[56] References Cited

U.S. PATENT DOCUMENTS

| | | | |
|---|---|---|---|
| 2,337,556 | 12/1943 | Hosking | 428/680 |
| 2,879,191 | 3/1959 | Nippert et al. | 146/11.5 C |
| 3,381,364 | 5/1968 | Winter | 428/675 |
| 3,470,607 | 10/1969 | Rader et al. | 428/675 |
| 3,496,625 | 2/1970 | Winter | 428/675 |
| 3,522,112 | 7/1970 | McClain | 148/127 |
| 3,615,899 | 10/1971 | Kimura et al. | 148/11.5 C |
| 3,717,511 | 2/1973 | Wallbaum | 148/11.5 C |
| 3,721,535 | 3/1973 | Pryor et al. | 428/675 |
| 4,198,248 | 4/1980 | Mandingo et al. | 148/11.5 C |
| 4,429,022 | 1/1984 | Breedis et al. | 148/127 |
| 4,442,182 | 4/1984 | Chart | 148/127 |
| 4,498,121 | 2/1985 | Breedis et al. | 428/652 |
| 4,589,930 | 5/1986 | Kumagai | 148/11.5 C |

FOREIGN PATENT DOCUMENTS

| | | | |
|---|---|---|---|
| 1165876 | 3/1964 | Fed. Rep. of Germany | 148/11.5 C |
| 88996 | 8/1978 | Japan | 148/11.5 C |
| 104597 | 8/1979 | Japan | 148/11.5 C |
| 87857 | 5/1986 | Japan | 148/11.5 Q |

OTHER PUBLICATIONS

"Electrical Manufacturing", Aug. 1956, pp. 117–121.
"Metallic Materials Specification Handbook", Robert B. Ross, Third Edition, pp. 247–250, Editor E. & F. N. Spon, GB; 27D Nickel-Copper Wrought and Cast Alloys.

*Primary Examiner*—John J. Zimmerman
*Attorney, Agent, or Firm*—Gregory S. Rosenblatt; Paul Weinstein

[57] ABSTRACT

The present invention relates to composites having excellent combinations of bending strength, electrical conductivity, stress relaxation in bending and bend formability and having particular utility in electrical connector applications. The composites of the present invention have a core formed from a copper base alloy having an electrical conductivity of at least about 80% IACS and a clad formed from a copper-nickel alloy containing more than about 30% by weight nickel. Preferred composites are triclad composites formed from copper alloy C151 and MONEL 400 and having clad layer thicknesses of at least about 10%, most preferably at least about 20%, of the overall composite thickness.

7 Claims, 1 Drawing Sheet

COMPOSITES HAVING IMPROVED RESISTANCE TO STRESS RELAXATION

This application is a division of U.S. patent application Ser. No. 866,665, filed May 27, 1986 now U.S. Pat. No. 4,735,868.

The present invention relates to composites having improved resistance to stress relaxation in bending and particular utility in high temperature electrical connector applications.

Composite metal laminates have been used in a variety of applications because of the unique combinations of properties that can often be obtained by joining dissimilar core and cladding materials. Single alloy materials suffer the disadvantage that their physical properties often cannot be greatly modified even through the use of techniques such as thermal treatments and alloying. Composites, on the other hand, generally permit retention of the desirable bulk properties of the core material while the apparent properties of the cladding are being generated. As a result, one is often able to obtain at a reasonable cost composites having greatly modified and desirable properties over those of a single alloy.

Composites utilizing copper or copper base alloys as the core material have been found to be particularly useful. This is because of the many desirable properties of copper such as relatively high electrical and thermal conductivity, good strength properties and excellent cold formability. Applications for copper composites have included coinage, thermostatic members, and electrical conductors and contacts such as electrically conductive spring materials. The types of materials used for the core and for the cladding have of course varied from application to application.

The following patents illustrate various copper composites and their applications. U.S. Pat. No. 2,337,556 to Hoskins relates to a composite electrical cable in which a layer of MONEL metal, a copper-nickel alloy, surrounds a copper, steel or brass wire core. The purpose of the MONEL layer is to improve the adhesion between the wire core and its protective rubber covering. U.S. Pat. Nos. 2,253,382 to Lee and 3,767,370 to Ornstein illustrate copper composites having utility as thermostatic members. In the Lee patent, the thermostatic member comprises two metal elements, one of which is a copper-iron-silicon-nickel alloy and the other of which is MONEL metal. In the Ornstein patent, the thermostatic member comprises a triclad having a core formed from a copper-zirconium alloy and cladding selected from either a nickel-chromium-iron alloy, a manganese-copper-nickel alloy or a nickel-iron alloy known as INVAR. U.S. Pat. No. 4,429,022 to Breedis et al. relates to a copper composite for coinage applications. The Breedis et al. composite comprises a deoxidized copper base alloy core, preferably formed from a copper-zirconium alloy, and a dissimilar copper alloy clad, preferably formed from a copper-aluminum-silicon alloy.

U.S. Pat. Nos. 3,251,660 to Finsterwalder, 3,861,884 to Popplewell et al., 4,442,182 to Chart and 4,498,121 to Breedis et al. illustrate copper composites suitable for use in electrical applications. The Finsterwalder patent relates to a copper composite having utility as an electrically conductive spring material. The composite has a copper alloy core and a cladding formed from either an age hardenable or precipitation hardenable stainless steel or nickel base alloy such as a high nickel-chromium-iron alloy sold under the trademark INCONEL X. The copper alloy core in this composite may be formed from a copper-zirconium alloy. The Popplewell et al. patent relates to a copper composite having a copper-iron-cobalt alloy core and a clad formed from nickel or a copper-nickel alloy such as MONEL. The Chart patent illustrates a different type of composite having utility in electrical connector applications. This composite has a first component formed from a first metal or metal alloy welded to a second component formed from a second metal or metal alloy. A wide number of composites are possible using this technique. One such composite comprises a MONEL 500 alloy bonded to a copper base alloy designated CDA 647. Finally, the Breedis et al. patent illustrates a composite having utility in leadframe and beam lead tape applications comprising a copper-nickel cladding bonded to a copper base alloy core. If desired, the core could be formed from copper alloy C151 which is a copper-zirconium alloy.

In many modern applications, electrical connectors are exposed to elevated temperatures. For example, electrical connectors within automobile engine compartments are subjected to extremes of temperature. The current trend in electrical connectors is toward small connectors having improved resistance to stress relaxation at elevated temperatures. However, decreasing the size of the connector usually means that increased strength properties such as a higher yield strength in bending are required. The difficulty in obtaining increased strength properties is that these properties must be obtained without sacrificing other desirable properties such as bend formability. One way of achieving the desired combination of properties is through the use of composite materials.

Accordingly, it is an object of the present invention to provide a composite material having improved resistance to stress relaxation in bending at temperatures of at least about 150° C.

It is a further object of the present invention to provide a composite material as above having an excellent combination of strength and electrical conductivity properties.

It is a further object of the present invention to provide a composite material as above having particular utility as an electrical connector.

It is a further object of the present invention to provide a process for forming a composite material as above.

These and other objects and advantages will become more apparent from the following description and drawings.

The foregoing objects are achieved by the present invention through the formation of a composite comprising a core formed from a copper base alloy having a conductivity of at least about 80% IACS and at least one clad layer formed from a copper-nickel alloy containing more than about 30% nickel by weight. In a preferred embodiment, the core is clad with the copper-nickel alloy on two opposed surfaces. It has been found that a copper base alloy consisting essentially of from about 0.05% to about 0.5%, preferably from about 0.05% to about 0.15%, zirconium and the balance essentially copper is particularly useful for the core material. This is because this alloy has a fairly high electrical conductivity as well as excellent strength and stress relaxation properties. It has also been found that a copper-nickel alloy containing from about 63% to about 70% nickel sold under the trademark MONEL 400 is particularly useful as the clad material. As used herein, the percentages given for each alloy constituent are weight percentages.

The thickness of the clad material in the composites of the present invention has been found to play an important role in providing the desired improvements in stress relaxation at elevated temperatures. For example, composites formed in accordance with the present invention and with each clad layer having a thickness representing about 10% of the overall composite thickness exhibit about 75% stress remaining in the composite after exposure to a temperature of about 200° C. for about 100,000 hours. At clad thicknesses of at least about 20%, the stress remaining in the composite after exposure to a temperature of about 200° C. for about 100,000 hours is greater than about 80%. Clad thickness has also been found to play a role in improving other properties such as bending strength.

Figure 1:
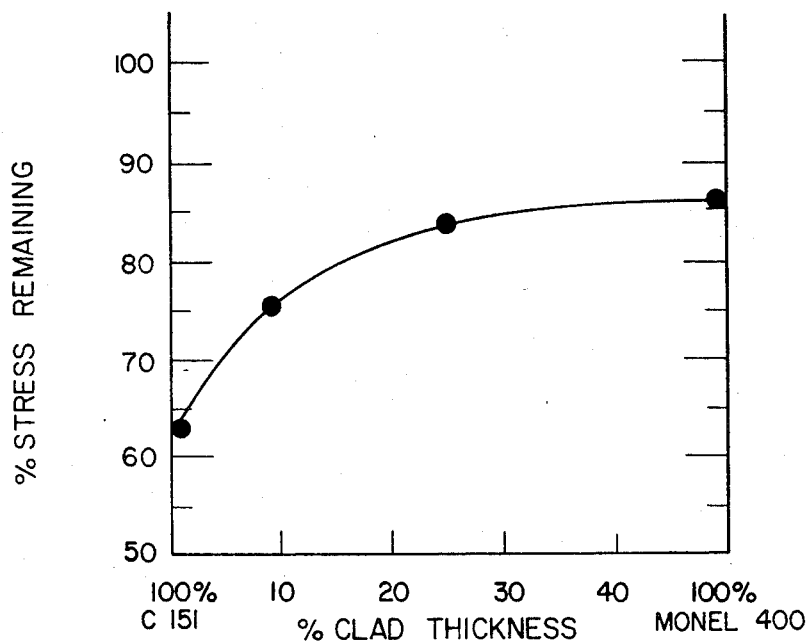
FIG. 1 is a graph illustrating the relationship between the clad thickness of alloy C151/MONEL 400 composites and the stress remaining in the composites after exposure to 200° C. for about 100,000 hours.

The composites of the present invention have utility in electrical applications as an electrical connector. For example, the composites may be used for components such as burn-in sockets and card-edge connectors. The composites may also be used for electrical connectors that are to be exposed to relatively high temperatures for prolonged periods of time such as connectors used in automobiles.

Composites formed in accordance with the present invention comprise a core formed from a copper base alloy and a cladding formed from a copper-nickel alloy. Where the composite takes the form of a triclad, the cladding material is bonded to the core material on two opposed surfaces.

The core material preferably comprises a copper base alloy having an electrical conductivity greater than about 80% IACS. In addition, it is desirable from a bonding standpoint that the copper base alloy core material have relatively high strength properties. By using such an alloy for the core, one is able to significantly reduce the likelihood of forming corrugations at the core/clad interface(s) during bonding. Copper alloy C151, a copper-zirconium alloy produced by Olin Corporation, has been found to be a particularly useful core material because of its combination of strength, stress relaxation and electrical conductivity properties. Copper alloy C151 consists essentially of from about 0.05% to about 0.5% zirconium, preferably from about 0.05% to about 0.15% zirconium, and the balance essentially copper. Copper alloy C151 is also useful because of its scrap compatibility.

The cladding material comprises a copper-nickel alloy having a nickel content greater than about 30% by weight, preferably at least about 50%. These alloys have been found to be particularly useful as a clad material because of their bend deflection and stress relaxation performance. MONEL 400, in particular, has been found to be a useful cladding material. MONEL 400 consists essentially of from about 63% to about 70% nickel, up to about 2% manganese, up to about 2.5% iron, up to about 0.24% sulfur, up to about 0.3% carbon, up to about 0.5% silicon and the balance essentially copper. MONEL 400 is also useful because its strength properties match well with those of copper alloy C151.

The composites of the present invention may be formed by rolling together the core and cladding in strip form in a single pass with a reduction of from about 50% to about 75%. After bonding, the bonded core and cladding may be subjected to a heat treatment for recrystallizing both components. This heat treatment may be performed at a temperature in the range of from about 600° C. to about 980° C. for a time period from about 2 minutes to about 24 hours. Preferably, it is performed at a temperature in the range of from about 700° C. to about 800° C. for a time period in the range of from about 30 minutes to about 4 hours. The heat treatment may be performed using any conventional heat treatment apparatus known in the art. While it is preferred to subject the composites of the present invention to such a recrystallization heat treatment, it is not absolutely necessary to perform such a treatment.

After the recrystallization heat treatment, the composite may, if desired, be cooled to a temperature in the range of from about 475° C. to about 725° C., preferably to a temperature from about 550° C. to about 650° C., and held at the temperature for a time of at least about 30 minutes, preferably for a time in the range of from about 2 hours to about 4 hours. It has been found that such a treatment increases the electrical conductivity of the composite core material.

After bonding, the composites of the present invention may be subjected to further cold working, such as rolling to final gage, if needed. Reductions up to about 85% may be taken without significantly reducing the bond strength.

The core and cladding materials entering the roll bite may have any desired thickness and may be in any desired temper. For example, the core material may be provided to the bonding apparatus in plate form having a thickness less than about 0.5". The cladding material may also be provided in plate form having a thickness less than about 0.25". Surface oxides, unless massive, are generally no handicap to the bonding process. It is desirable, however, to remove dirt or adhering lubricant from the surface of the core and clad materials prior to bonding to assure good frictional contact between the core and the cladding. Any suitable cleaning technique known in the art may be used to remove the dirt and/or lubricant.

In a preferred manner of bonding the core to the cladding, an angle in excess of about 5° and generally in excess of about 10° is provided between the core and cladding upon entering the rolls. This angle is provided to insure that the core and the cladding will not come together earlier than in the bite of the rolls. This is not essential, although it is preferred. Generally, the included angle between the core and cladding is between 5° and 22°.

The thickness of the clad material in the final composite has been found to play an important role in determining certain physical properties of the composite such as stress relaxation at temperatures of at least about 150° C., bending strength, and electrical conductivity. For example, the stress remaining in a triclad composite having a copper alloy C151 core and a MONEL 400 cladding with each cladding layer having a thickness equal to about 10% of the overall composite thickness is about 75% after exposure to a temperature of about 200° C. for about 100,000 hours. At clad thicknesses greater than about 20%, the stress remaining in the same composite after exposure to about 200° C. for about 100,000 hours is at least about 80%. In comparison, monolithic MONEL 400 has about 86% stress remaining after exposure to a 200° C. temperature for about 100,000 hours. At 10% and 25% clad thicknesses, the cantilever bending offset strength at 0.1% offset for the same composite is about 73.2 ksi and about 107.2 ksi, respectively. In comparison, monolithic MONEL 400 exhibits a cantilever bending offset strength at 0.1% offset of about 109.7 ksi.

It can be seen from the foregoing discussion that alloy C151/MONEL 400 composites formed in accordance with the present invention demonstrate very favorable stress relaxation and bending strength properties. In addition, the composites have very favorable electrical conductivities.

To demonstrate the properties of composites formed in accordance with the present invention and to compare them with other materials used for similar applications, the following series of examples were conducted.

EXAMPLE I

Composites having a core of copper alloy C151 and a clad of MONEL 400 were prepared. Composites having a 10% clad thickness were produced by processing the materials in the following manner. Copper alloy C151 core material milled to 0.510" was cold rolled 61%, annealed at 550° C. for 3 hours, cold rolled 65%, annealed again at 550° C. for 3 hours, and cold rolled 20% to a gauge of 0.0563". MONEL 400 clad material having an initial gauge of 0.249" was cold rolled 59%, annealed at 843° C. for 1 hour, cold rolled 59% again, annealed again at 843° C. for 1 hour, cold rolled 58%, annealed at 843° C. for 1 hour, finally cold rolled 60% to a gauge of 0.007", and annealed at 843° C. for 1 hour. The composite was formed by roll bonding the C151 core and the MONEL 400 clad layers using a 60% reduction. After bonding, the composite was annealed at 771° C. for 2 hours, cooled to 550° C. and held at 550° C. for 2 hours. The composite was then subjected to a final 29% cold rolling treatment.

Composites having a 25% clad thickness were produced in the following manner. Copper alloy C151 core material milled to 0.510" was cold rolled 61%, annealed at 550° C. for 3 hours, cold rolled 51%, annealed at 600° C. for 1 hour, cold rolled 56%, annealed at 550° C. for 3 hours, and then cold rolled to a gauge of 0.0352". The MONEL 400 clad material was processed from an initial gauge of about 0.249" down to a gauge of 0.0176" as before through a series of cold rolling steps at reductions of 59% amd 58% and interanneals at 843° C. for 1 hour. The composite was then formed by roll bonding the core and clad materials together using a 60% reduction. Thereafter, the composite was annealed at 771° C. for 2 hours, cooled to 550° C., held at 550° C. for 2 hours, and then cold rolled 29%.

For comparison purposes, monolithic MONEL 400 and copper alloy C151 samples were also prepared. The MONEL 400 samples were prepared from material having an initial gauge of 0.249". The material was then cold rolled 59%, annealed at 843° C. for 1 hour, cold rolled 59%, annealed at 771° C. for 2 hours, cooled to 550° C., held at 550° C. for two hours, and cold rolled 29% to a gauge of 0.0298". Copper alloy C151 samples were prepared from material having an initial gauge of 0.510". The material was then cold rolled 61%, annealed at 550° C. for 3 hours, cold rolled 60%, annealed at 771° C. for 2 hours, cooled to 550° C., held at 550° C. for 2 hours, and cold rolled to 0.0571" gauge.

The yield strength, tensile strength, elongation, 90° bend formability and electrical conductivity properties were measured using standard measurement tests. Tables I and II below report the results of these tests. The results reported for copper alloy C170, a copper-beryllium alloy, are taken from published data.

TABLE I

| Material | Yield Strength (ksi) | Tensile Strength (ksi) | Elongation (%) |
|---|---|---|---|
| 10% MONEL/C151 | 61.7 | 62.5 | 3.4 |
| 25% MONEL/C151 | 73.4 | 74.5 | 2.5 |
| MONEL 400 | 108.5 | 111.5 | 4.6 |
| C151 | 47.4 | 48.6 | 5.3 |
| C170 | 100.0 | 115.0 | 17.0 |

TABLE II

| Material | MBR/t Long. | MBR/t Trans. | Electrical Conductivity (% IACS) |
|---|---|---|---|
| 10% MONEL/C151 | 1.2 | 1.2 | 69.9 |
| 25% MONEL/C151 | 1.2 | 1.2 | 44.1 |
| MONEL 400 | sharp | sharp | 3.4 |
| C151 | 0.8 | 0.8 | 91.7 |
| C170 | 1.5 | 1.7 | 26.5 |

The results reported in Tables I and II demonstrate that the composites of the present invention have excellent combinations of strength, electrical conductivity, and bend formability characteristics. For example, the composites of the present invention have better electrical conductivity and bend formability properties than monolithic C170. In addition, the composites possess strength properties better than those of monolithic C151.

EXAMPLE II

Samples of 10% MONEL/C151 and 25% MONEL/C151 composites as well as monolithic MONEL 400 and C151 alloy samples were prepared as in Example I and were subjected to a standard bending stress relaxation test. In this test, each sample was subjected to an initial applied load or stress. The applied load was a percentage of the Room Temperature Yield Strength (% RTYS) of the sample. Each sample was then placed in a furnace while under load and heated to a temperature of either 150° C. or 200° C. The samples while under load were held at the particular temperature for a time period ranging from about 1 hour to about 1060 hours. At selected intervals, samples were withdrawn from the furnace and the stress remaining in the sample was determined. From this data, the stress remaining in the sample was determined for 1 hour, 1000 hours and 100,000 hours. The results of this test are reported in Table III below.

FIG. 1 is a graph of the % stress remaining as a function of clad thickness for MONEL 400 clad on C151 composites exposed to 200° C. for about 100,000 hours. The two ordinates of FIG. 1 correspond to monolithic C151 and MONEL 400 respectively.

FIG. 1 as well as the test results in Table III below clearly demonstrate the excellent resistance to stress relaxation in bending characteristics of the composites of the present invention. Composites having a clad thickness of at least 10% exhibit better stress relaxation properties than monolithic C151. At clad thickness greater than about 20%, the composites exhibit stress relaxation properties substantially equal to those of monolithic MONEL 400. Table III also demonstrates that the composites of the present invention may be stressed in excess of their room temperature yield strength without any serious fall in stress remaining at elevated temperatures.

TABLE III

| Material | Temp (°C.) | Initial ksi/ (% RTYS) | Stress Remaining 1 hr ksi/ (% Init) | $10^3$ hrs ksi/ (% Init) | $10^5$ hrs. ksi/(% Init) |
|---|---|---|---|---|---|
| 10% MONEL/C151 | 150 | 49.4(80.0) | 43.4(87.8) | 38.3(77.6) | 35.1(71.0) |
| " | 200 | 49.4(80.0) | 41.8(84.6) | 39.5(79.9) | 37.7(76.4) |
| " | " | 57.5(93.2) | 46.7(81.2) | 42.7(74.2) | 40.4(70.3) |
| 25% MONEL/C151 | 150 | 58.7(80.0) | 53.9(91.8) | 50.5(86.0) | 49.4(82.3) |
| " | " | 83.3(113.5) | 76.9(92.4) | 74.2(89.1) | 72.7(87.3) |
| " | 200 | 58.7(80.0) | 51.7(88.0) | 50.8(86.5) | 50.3(85.6) |
| " | " | 83.3(113.5) | 72.5(87.0) | 70.9(85.1) | 69.6(83.5) |
| MONEL 400 | 150 | 86.8(80.0) | 78.2(90.1) | 76.4(88.0) | 75.1(86.5) |
| " | 200 | 86.8(80.0) | 79.2(91.2) | 76.3(87.9) | 74.5(85.8) |
| C151 | 150 | 37.9(80.0) | 32.1(84.7) | 27.7(73.1) | 24.8(65.5) |
| " | 200 | 37.9(80.0) | 32.2(85.0) | 27.3(72.0) | 23.8(62.7) |

EXAMPLE III

Figure 2:
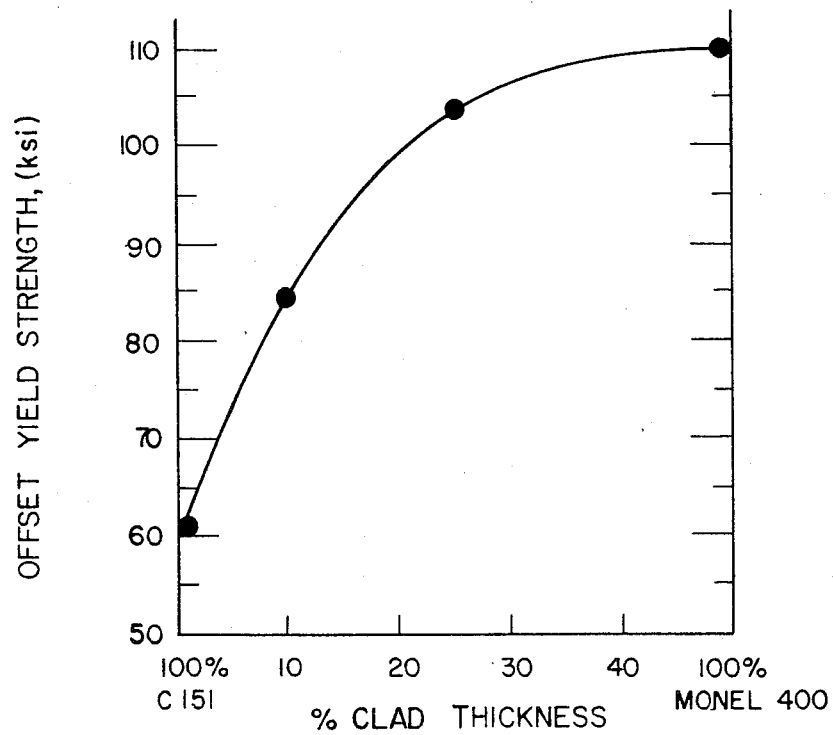
FIG. 2 is a graph illustrating the cantilever bending offset strength at 0.1% offset for MONEL 400 clad on alloy C151 as a function of the clad thickness.

10% MONEL/C151 and 25% MONEL/C151 composite samples were prepared as in Example I. These samples as well as samples of monolithic MONEL 400 and copper alloy C151 were subjected to a standard cantilever bend deflection test. The results of the test are reported in Table IV. FIG. 2 illustrates the cantilever bending offset strength at 0.1% offset as a function of clad thickness for MONEL 400 clad on C151. The two ordinates of FIG. 2 correspond to monolithic C151 and MONEL 400, respectively.

TABLE IV

| Material | $E_B$* $10^3$ ksi | Offset Y.S./ (ksi) 0.01% Offset | Secant Modulus (ksi) 0.05% Offset | 0.1% Offset |
|---|---|---|---|---|
| 10% MONEL/C151 | 19.5 | 39.0/18.8 | 55.7/16.7 | 73.2/15.5 |
| 25% MONEL/C151 | 21.5 | 50.2/20.6 | 87.5/19.0 | 107.2/17.7 |
| MONEL 400 | 21.7 | 64.6/20.8 | 93.4/19.0 | 109.7/18.1 |
| C151 | 14.5 | 45.4/14.1 | 53.6/12.9 | 60.4/11.8 |
| C170 | 18.4 | 107/18 | 121/17.1 | 129/16.1 |

*$E_B$ = Elastic Modulus in Bending

The data in Table IV demonstrates that the bend deflection properties of a 25% MONEL/C151 composite are comparable to those of monolithic MONEL 400. FIG. 2 illustrates the improvement in bend deflection properties that can be obtained over monolithic C151 with a clad having a 10% thickness. At clad thickness greater than about 20%, the bend deflection properties of the composites of the present invention are substantially equivalent to those of monolithic MONEL 400.

In summary, the composites of the present invention exhibit moderate tensile properties, good formability, moderate to high electrical conductivity, excellent cantilever bending strength and outstanding stress relaxation properties at temperatures of at least about 150° C. A composite with a 10% clad thickness shows exceptional stability for a material with an electrical conductivity of 70% IACS. Composites with a 25% clad thickness exhibit strength properties comparable with those of monolithic copper alloy C170 while exhibiting better bend formability and higher electrical conductivity. It is this unusual combination of properties that make the composites of the present invention particularly suitable for use as electrical connectors.

While the present invention has been described in the context of triclad composites, biclad composites of a copper base alloy core material having an electrical conductivity of at least about 80% IACS and a copper-nickel clad material having a nickel content greater than about 30% may also be formed using the techniques described herein.

The patents set forth in the specification are intended to be incorporated by reference herein.

It is apparent that there has been provided in accordance with this invention composites having improved resistance to stress relaxation which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. A process for forming a composite having improved resistance to stress relaxation at temperatures of at least about 150° C., said process comprising:
   bonding a substrate material comprising a copper base alloy consisting essentially of from about 0.05% to about 0.5% by weight zirconium and the balance essentially copper to at least one layer of a copper-nickel alloy clad material containing more than about 30% nickel;
   heating said bonded substrate and clad material to a temperature from about 600° C. to about 980° C. for a time period from about 2 minutes to about 24 hours; and
   increasing the electrical conductivity of said substrate material by cooling said bonded materials to a temperature in the range of from about 475° C. to about 725° C. for at least about 30 minutes.

2. The process of claim 1 wherein:
   said heating step comprises heating said bonded materials to a temperature from about 700° C. to about 800° C. for a time in the range of from about 30 minutes to about 4 hours; and
   said electrical conductivity increasing step comprises cooling said bonded materials to a temperature in the range of from about 550° C. to about 650° C. for a time period in the range of from about 2 hours to about 4 hours.

3. The process of claim 1 further comprising:
cold working said bonded materials after said electrical conductivity increasing step.

4. The process of claim 1 wherein said bonding step comprises:
rolling said substrate and clad materials together in a single pass with a reduction from about 50% to about 75% to produce a composite with a substrate and at least one clad layer having a thickness of at least about 10% of the overall thickness of said composite.

5. The process of claim 4 wherein said rolling step produces a composite having said substrate and at least one clad layer having a thickness of at least about 20% of the overall thickness of said composite.

6. The process of claim 4 wherein said bonding step comprises:
bonding the substrate material to two layers of the copper-nickel alloy clad material thereby forming a three layer composite.

7. The process of claim 1 wherein said bonding step comprises:
bonding a substrate material comprising a copper base alloy consisting essentially of from about 0.05% to about 0.15% by weight zirconium and the balance essentially copper to at least one layer of a copper-nickel alloy clad material containing more than about 30% by weight nickel.

* * * * *